United States Patent
Czechowski et al.

(10) Patent No.: US 11,187,337 B2
(45) Date of Patent: Nov. 30, 2021

(54) RUPTURE DISK

(71) Applicant: Goodrich Corporation, Charlotte, NC (US)

(72) Inventors: Kamil Czechowski, Wroclaw (PL); Artur Wilczyński, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/712,296

(22) Filed: Dec. 12, 2019

(65) Prior Publication Data

US 2021/0095774 A1    Apr. 1, 2021

(30) Foreign Application Priority Data

Sep. 27, 2019  (EP) .................................... 19461585

(51) Int. Cl.
*F16K 17/16*    (2006.01)

(52) U.S. Cl.
CPC .......... *F16K 17/16* (2013.01); *Y10T 137/1692* (2015.04)

(58) Field of Classification Search
CPC ........................... F16K 17/16; Y10T 137/1692
USPC ..... 137/68.19, 68.28, 68.11, 68.23; 277/316, 277/573, 593, 594, 639, 644, 645
See application file for complete search history.

(56) References Cited

U.S. PATENT DOCUMENTS

| | | | | |
|---|---|---|---|---|
| 2,922,833 A | | 1/1960 | Philipp | |
| 2,934,237 A | * | 4/1960 | Hausen | F16K 17/162 220/89.2 |
| 3,635,234 A | * | 1/1972 | Dawson | F16K 13/04 137/68.25 |
| 3,778,176 A | * | 12/1973 | Pax | F16J 15/027 404/65 |
| 3,845,878 A | * | 11/1974 | Carlson | B60P 3/2255 220/89.3 |
| 4,084,602 A | * | 4/1978 | Cook | A62C 13/76 137/68.13 |
| 4,219,040 A | * | 8/1980 | Fallon | F16K 17/162 137/68.23 |
| 4,553,559 A | * | 11/1985 | Short, III | F16K 17/162 137/68.25 |
| 4,566,476 A | * | 1/1986 | Fallon | B67D 1/125 137/71 |
| 2002/0153669 A1 | | 10/2002 | Caplain et al. | |
| 2002/0175479 A1 | | 11/2002 | Behill et al. | |
| 2009/0035157 A1 | * | 2/2009 | Carboneri | F16K 17/16 417/279 |

(Continued)

FOREIGN PATENT DOCUMENTS

| | | |
|---|---|---|
| EP | 1369628 A2 | 12/2003 |
| GB | 781653 A | 8/1957 |

(Continued)

OTHER PUBLICATIONS

European Search Report for Application No. 19461585.2, dated Mar. 19, 2020, 10 pages.

*Primary Examiner* — Minh Q Le
(74) *Attorney, Agent, or Firm* — Cantor Colburn LLP

(57) ABSTRACT

A rupture disk for use in a fluid control system includes a membrane and a compressible flange, around a perimeter of the membrane. The flange defines at least one perimetrically extending void.

20 Claims, 5 Drawing Sheets

(56) References Cited

U.S. PATENT DOCUMENTS

| | | | | |
|---|---|---|---|---|
| 2009/0140499 A1* | 6/2009 | Kline | ................... | H05K 9/0015 |
| | | | | 277/645 |
| 2010/0122735 A1* | 5/2010 | Schramm | ............ | F16K 17/1613 |
| | | | | 137/68.19 |
| 2017/0067570 A1* | 3/2017 | Said | ........................ | F16K 27/00 |
| 2018/0313455 A1 | 11/2018 | Said | | |

FOREIGN PATENT DOCUMENTS

| | | |
|---|---|---|
| GB | 2014659 A | 8/1979 |
| JP | H0221071 A | 1/1990 |
| WO | 2019075255 A1 | 4/2019 |

\* cited by examiner

RUPTURE DISK

FOREIGN PRIORITY

This application claims priority to European Patent Application No. 19461585.2 filed Sep. 27, 2019, the entire contents of which is incorporated herein by reference.

FIELD

The present disclosure relates to a rupture disk.

BACKGROUND

A rupture disk is a device comprising a sacrificial membrane or diaphragm that is designed to rupture under specific circumstances in order to rapidly release a pressurized fluid.

Rupture disks are sometimes used as one-time safety devices. In such applications, if the pressure of a system increases beyond an allowable threshold, the rupture disk is designed to rupture, thus allowing pressure to vent out of the system.

In other applications, rupture disks can be configured to be ruptured by a mechanism other than the fluid pressure itself—e.g. in response to a manual action by a user. This may be achieved by removing an engagement rod from the rupture disk, thus allowing the membrane to rupture (i.e. a burst disk), or by puncturing the membrane (i.e. a puncture disk). Such manually actuated rupture disks are used, for example, in high pressure inflation valves where it is desirable for an object, such as an inflatable life raft or evacuation slide, to be inflated rapidly.

When installing a rupture disk within a housing, the rupture disk must form a tight seal in order to prevent the leakage of pressurized fluid around the edge of the disk. Care must be taken not to damage the rupture disk during this installation process. Installation of rupture disks may be aided by the application of a lubricant, which is used to improve the sealing properties of the rupture disk while reducing the risk of damaging the membrane. However, this method is not always effective.

It is desired to provide an improved rupture disk.

SUMMARY

In a first aspect, there is provided a rupture disk for use in a fluid control system. The rupture disk includes a membrane and a compressible flange, around a perimeter of the membrane. The flange defines at least one perimetrically extending void.

In another aspect, there is provided a fluid control system that includes a rupture disk and a housing for the rupture disk. The rupture disk includes a membrane; and a compressible flange, around a perimeter of the membrane, wherein the flange defines at least one perimetrically extending void.

In a further aspect, there is provided a method of installing a rupture disk within a housing, The rupture disk comprises: a membrane; and a compressible flange, around a perimeter of the membrane, wherein the flange defines at least one perimetrically extending void. The method includes: positioning the rupture disk within the housing.

The provision of such a void within the flange of the rupture disk can allow significant expansion of the flange to be achieved parallel to the disk when the flange is compressed perpendicularly to the disk. Such compression may increase the contact force between the flange and a housing for the rupture disk, thus affecting a tight seal.

Furthermore, as a diameter of the rupture disk may be smaller prior to compression than after compression, the rupture disk may be easily positioned within a housing, potentially with little or no sealing lubricant required. This means that a rupture disk exemplifying the present disclosure may be inserted into an assembly quickly and easily, and with low chance of damaging the membrane.

The method of installing the rupture disk may comprise compressing the flange. In particular, it may comprise compressing the flange in a direction axial to the disk.

The housing or fluid control system may comprise a compression mechanism for compressing the flange of the rupture disk. This is explained in more detail below.

The rupture disk may be a burst disk. The rupture disk may be a puncture disk.

The rupture disk may be rotationally symmetric about an axis—e.g. being a regular-polygonal disk or a circular disk. In some examples, an outer face (e.g. the entire outer surface) of the rupture disk is circularly symmetric about an axis. However, in some such examples the flange of the rupture disk may have rotational symmetry only of finite integer degree internally, or no internal rotational symmetry at all.

The flange may comprise an outer face that is substantially cylindrical—e.g. an open circular cylinder.

In some examples, a maximum dimension (e.g. diameter) of the rupture disk, including the flange, is between 5 mm and 30 mm, e.g. between 10 mm and 25 mm, e.g. around 18 mm. In some examples, a maximum thickness of the rupture disk in an axial direction is defined by the flange; this maximum thickness may be between 1 mm and 5 mm, e.g. between 2 mm and 3 mm, e.g. around 2.2 mm.

In a first set of examples, the rupture disk may be suitable for use in an inflation valve. The fluid control system may comprise an inflation valve. The housing may be part or all of an inflation valve, e.g. may be a housing of an inflation valve. It may be designed to be ruptured, directly or indirectly, by a mechanical rupture mechanism.

The rupture disk may be used to separate a volume of higher pressure fluid from a volume of lower pressure fluid. Upon rupture of the rupture disk, at least a portion of the pressurized fluid may be vented from the higher pressure volume to the lower pressure volume. Where an inflatable object, such as a personal floatation device, comprises the lower pressure volume, the vented higher pressure fluid may be used to inflate the inflatable object. For example, this arrangement may be used to rapidly inflate an inflatable life raft of an airplane.

In a second set of examples, the rupture disk may be suitable for use as a pressure relief device or other safety device or valve. The fluid control system may be a safety apparatus, such as a one-time over-pressure relief device. In such examples, the disk may be designed to rupture based on fluid pressure alone, without any mechanical rupture mechanism to trigger the rupturing. The housing may be part or all of a pressurized storage vessel.

The rupture disk may be designed to be ruptured when a pressure differential across the membrane exceeds a threshold level.

The rupture disk may be a single monolithic structure. It may be formed of a homogeneous material. The rupture disk may be manufactured from any suitable material or materials. In some examples, the rupture disk may comprise or consist substantially or wholly of silicon, aluminum, magnesium, or a combination or alloy of any of these.

The rupture disk may be manufactured in any suitable or desired way. In some examples, the rupture disk is manufactured using an additive manufacturing process, e.g. 3D printing. 3D printing is a low cost manufacturing method and facilitates the construction of features such as the one or more perimetrically extending voids in the flange of the rupture disk.

The membrane may be planar (at least, when not subjected to a pressure differential), although this is not essential. In some examples, the membrane is circular. The thickness of the planar membrane may be uniform. The membrane may be thinner than the compressible flange—e.g. less than 10%, 5% or 1% of the maximum axial extent of the uncompressed flange. In some examples, the maximum dimension (e.g. diameter) of the planar membrane is between 5 mm and 25 mm, e.g. between 10 mm and 20 mm, e.g. 15 mm. In some examples, the minimum and/or maximum thickness of the planar membrane is between 0.1 mm and 1 mm, e.g. between 0.2 mm and 0.5 mm, e.g. 0.3 mm. The thickness of the planar membrane may be selected such that the membrane is designed to rupture upon the application of a pressure equal to or greater than a predetermined threshold pressure. It will be appreciated that the planar membrane may adopt a curved shape on the application of a pressure differential across the membrane.

The compressible flange may extend around only a proportion (e.g. 50%, 90%, or more) or the entirety of the perimeter (e.g. circumference) of the planar membrane. The flange may have a substantially rectangular outer cross-section (i.e. perpendicular to the perimeter of the rupture disk). In some examples, the flange has a uniform height around the disk, which may be substantially equal to the height of the rupture disk.

The at least one perimetrically extending void may have a uniform cross-section. In some examples, the flange defines a plurality of perimetrically extending voids, having the same cross-section. In at least an uncompressed state, the one or more voids may have a polygonal cross-section. The one or more voids may have a quadrilateral cross-section. The one or more voids may have a substantially diamond-shaped cross-section. The one or more voids may have a substantially triangular cross-section. In some examples, the cross-section of the one or more voids is circular or elliptical. In some examples, the cross-section of the one or more voids is convex. In one example, at least one void has a diamond cross section, of 1 mm to 5 mm, e.g. around 1.3 mm, maximum radial extent, and of 1 mm to 5 mm, e.g. around 1.1 mm, maximum axial extent.

The provision of one or more voids within the compressible flange may enable substantial radial expansion of the compressible flange when, in use, the compressible flange is compressed, compared with a similarly-shaped solid flange. When the rupture disk is located within a housing (e.g. of a valve), the expansion of the flange of the rupture disk may be used to form a tight seal between the rupture disk and the housing—e.g. between an outer face of the rupture disk and a corresponding mating face of the housing. The seal may prevent fluid from passing between the rupture disk and the housing in an axial direction. Furthermore, as the diameter of the rupture disk is smaller when the rupture disk is not compressed, the rupture disk may be easily installed prior to compression, and then compressed in situ in order to form such an axial seal. Thus, at least in some examples, the rupture disk is installed without using a lubricant.

In some examples, a cross-section of each of the one or more voids is a closed shape, i.e. the void is completely enclosed within the compressible flange. In other examples, one or more of the voids is open—e.g. comprises a surface that defines a groove or furrow in the flange.

In some examples, the flange defines a plurality of distinct perimetrically extending voids. These may span different respective angular ranges around the flange.

The flange may further comprise one or more support segments. The one or more support segments may be within the flange. They may be span angular ranges around the flange that are not spanned by the one or more voids. They may be segments of the compressible flange that do not define one of the one or more voids. The one or more support segments may be solid segments, which may be solid across the whole cross-section of the flange. The support segments may improve the structural rigidity of the rupture disk. The rupture disk may comprise the same number of support segments and voids. The one or more support segments may all have the same cross-section.

In some examples, the flange defines a void (e.g. exactly one void) that extends continuously around the entire membrane—i.e. forming a complete loop. This may help provide uniform deformation under compression. In such examples, there may be no such support segments.

In some examples, the flange comprises a lip. The lip may protrude axially from an outer surface of the compressible flange. The lip may be perimetrically elongate. It may extend around the entire membrane. It may be rotationally symmetric. It may be circular. In some examples, a rotational axis of the lip is located at a center of the membrane (e.g. coaxial with the rupture disk). The housing may define a mating recess for receiving the lip. The lip may thus provide a further seal when the rupture disk is located within the housing. The seal may be strengthened when the flange is compressed. Where the rupture disk is located between a higher pressure volume and a lower pressure volume, this seal may help to prevent fluid leaking from the higher pressure volume to the lower pressure volume in a radial direction.

Installing the rupture disk may comprise positioning the rupture disk within a housing such that the rupture disk is arranged to contain a pressurized fluid to one side of the rupture disk. The rupture disk may be installed within the housing such that the flange abuts at least one mating surface of the housing. The mating surface may be axially-extending. It may be rotationally symmetric—e.g. circularly cylindrical. It may be of larger diameter than the uncompressed rupture disk—e.g. between 0.01% and 10% larger, such as up to around 1% larger, to allow for expansion of the rupture disk under compression.

In some examples, an axial force is applied to the rupture disk such that the rupture disk is axially compressed. This may comprise rotating a threaded nut—e.g. to engage with a thread of the housing.

In some examples, a compression mechanism may be provided. The compression mechanism may be actuated in order to apply an axial compression force to the flange of the rupture disk. The application of an axial force to the flange causes the rupture disk to be compressed in the axial direction and so expand in a radial direction. Where the rupture disk is arranged to abut a axially-extending mating surface of the housing, this radial expansion may establish a seal between the housing and the rupture disk. In some examples, the compression mechanism comprises a rotatable nut arranged to apply an axial force to the rupture disk.

The compression mechanism may further comprise a washer. The washer may be positioned between the nut and the rupture disk. In such an arrangement, the washer may serve to protect the rupture disk from being damaged by the nut. The washer may comprise an open cylinder. The washer may comprise a central bore for the passage of fluid. The washer may comprise any suitable or desired material. In some examples, the washer comprises a polymer material.

In some examples, the fluid control system—e.g. an inflation valve—comprises an actuator. The actuator may be operable by a user or by a control system to cause the rupture disk to rupture. Thus, in examples where the rupture disk is arranged to contain pressurized fluid (e.g. gas) within the valve, actuation of the actuator may be performed when it is desired to release the pressurized fluid from the valve.

In some examples the actuator comprises an engagement rod. The engagement rod may be movable from an engaged state, in which the engagement rod abuts a surface of the membrane of the rupture disk to prevent the rupture disk from rupturing, to a non-engaged state, in which the engagement rod is moved away from the membrane to allow the rupture disk to rupture due to a fluid pressure differential across the membrane.

In some examples, the actuator comprises a puncturing element. The puncturing element may be configured to puncture or cut the membrane, thus causing the rupture disk to rupture.

BRIEF DESCRIPTION OF THE DRAWINGS

Certain examples of the disclosure will now be described, by way of example only, with reference to the accompanying drawings in which.

DETAILED DESCRIPTION

Figure 1:
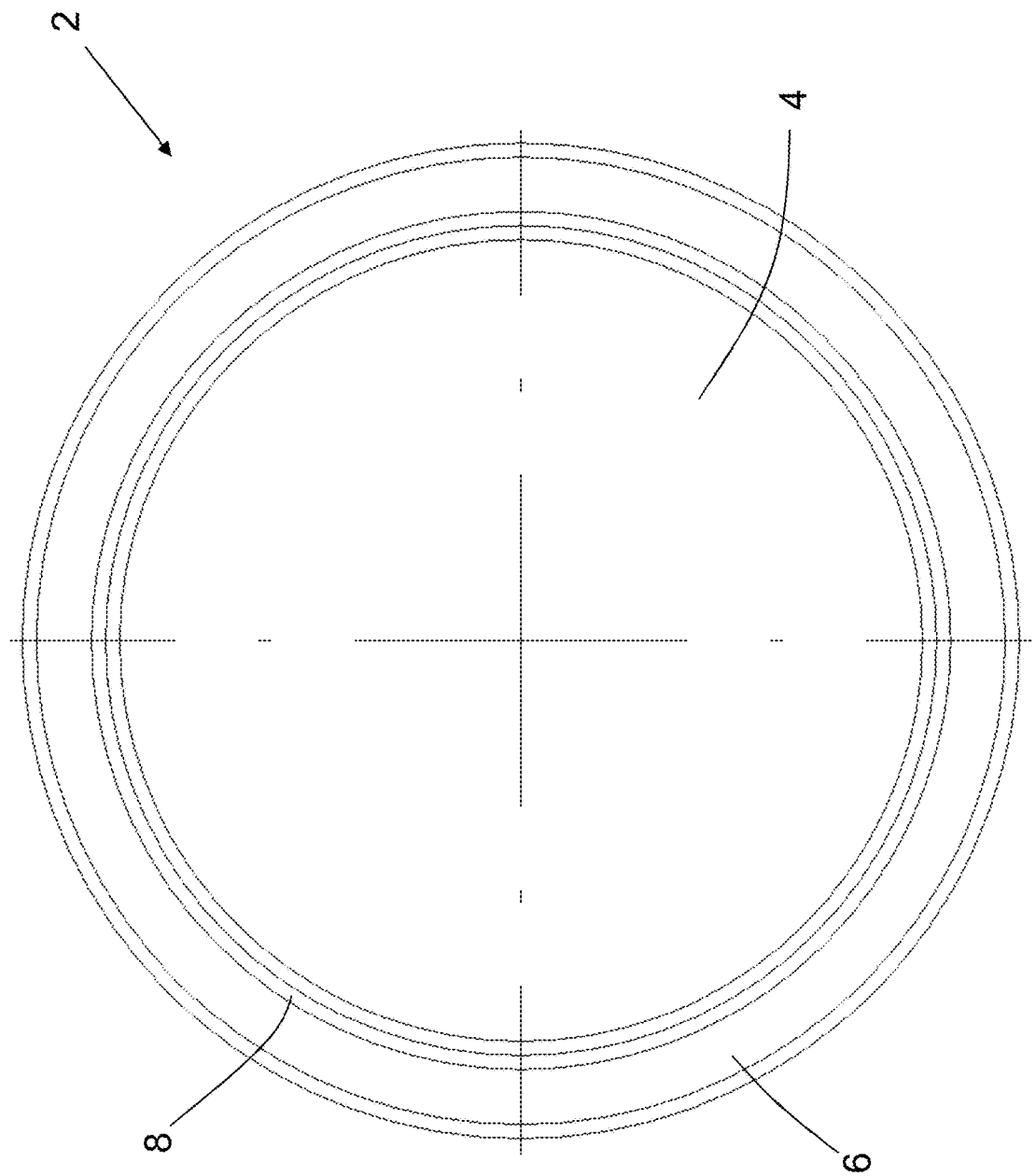
FIG. 1 shows a plan view of a burst disk in accordance with an example of the present disclosure, in a non-deformed state.

FIG. 1 shows a plan view of a burst disk 2 in an unburst state. The burst disk 2 comprises a circular membrane 4 and an annular flange 6, located around the membrane 4.

Figure 2:
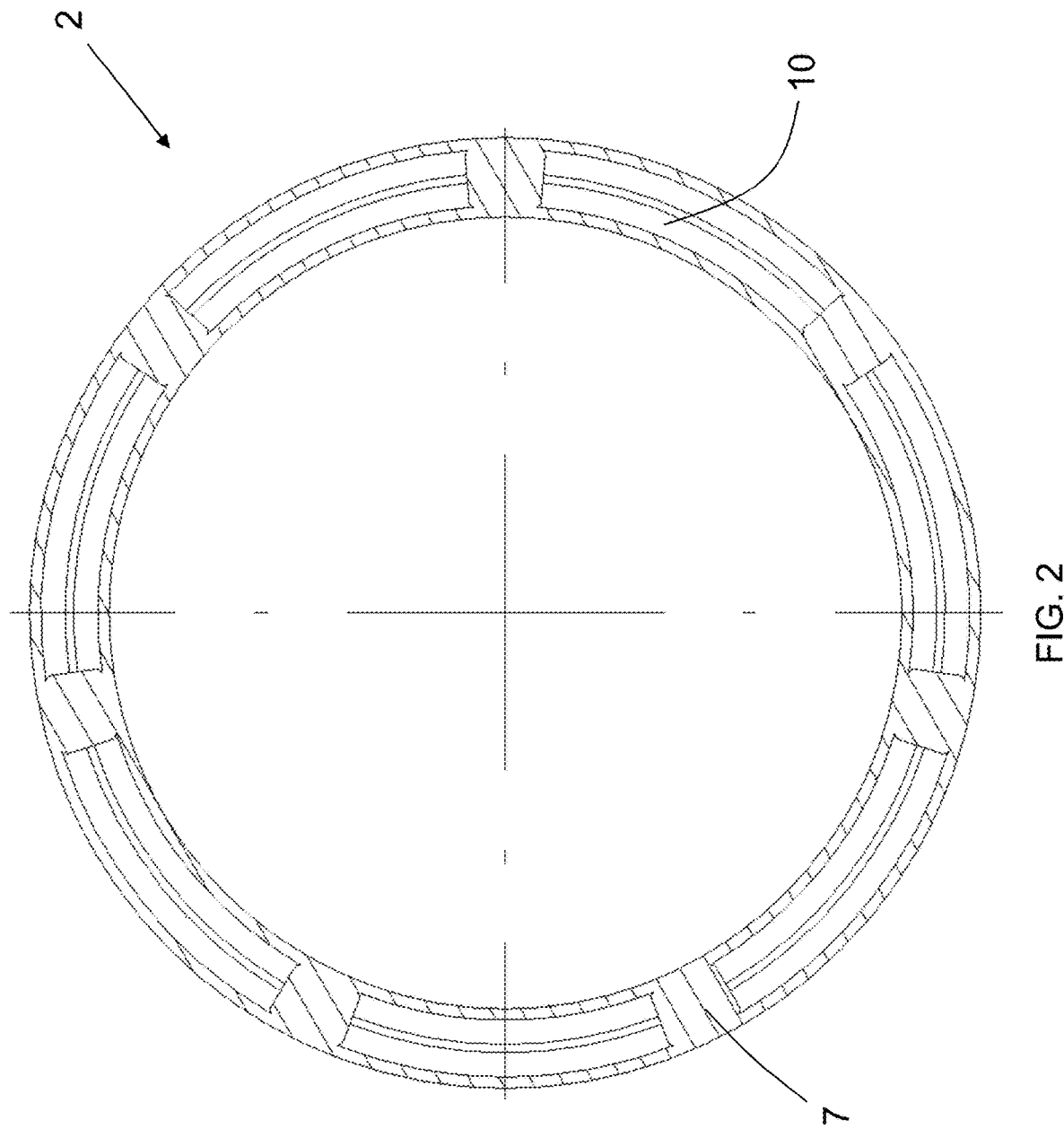
FIG. 2 shows a cross-sectional plan view of the burst disk of FIG. 1.
Figure 3:
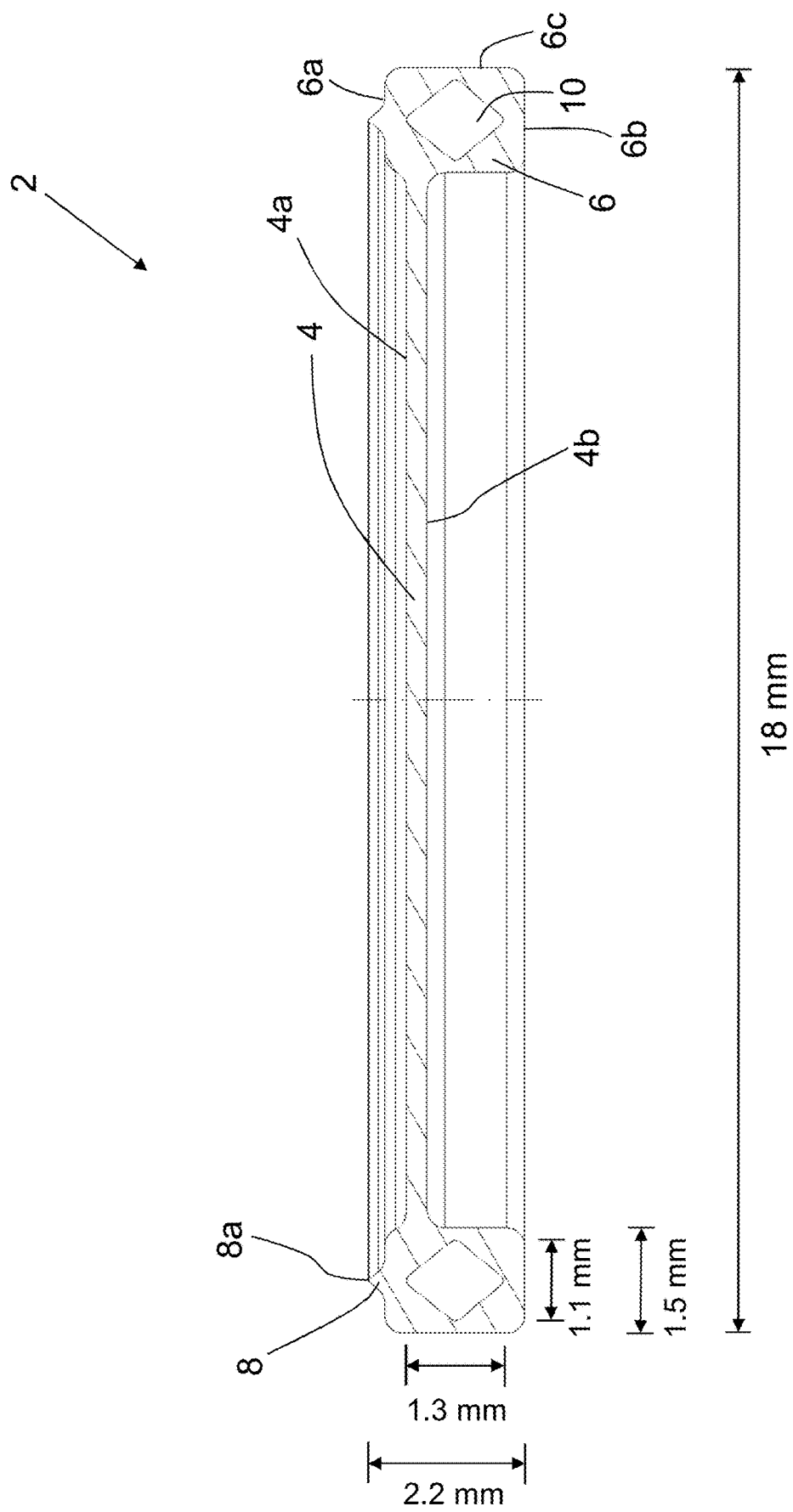
FIG. 3 shows a cross-sectional side view of the burst disk of FIG. 1.

FIG. 2 shows a horizontal cross-section at approximately half the depth of the burst disk 2, while FIG. 3 shows a vertical cross-section across a diameter of the burst disk 2.

The burst disk 2 in this example is a single monolithic component, formed of a homogeneous material. It may be manufactured in a single 3D printing operation from aluminum, silicon, magnesium or any other suitable material.

The flange 6 is arranged about the circumference of the circular membrane 4. The thickness of the membrane 4 is substantially uniform between its upper surface 4a and its lower surface 4b, and is substantially smaller than the thickness of the flange 6. For example, in the example shown in FIG. 1, the thickness of the membrane 4 is 0.3 mm, while the axial thickness of the flange 6 (including the sealing lip 8) is 2.2 mm. The membrane 4 in this example is planar when not in use, although it will be appreciated that it may distort (e.g. bulge) somewhat when subject to a pressure differential across its upper and lower faces. In other examples, the membrane 4 may curve out of the plane of the disk 2, even when not subject to a pressure gradient—e.g. it may be permanently domed.

The flange defines an annular sealing lip 8. This is an axial protrusion which extends circumferentially around an upper surface of the flange 6.

The flange 6 has a substantially rectangular cross-section of approximately 2.2 mm high by 1.5 mm wide, albeit with rounded corners. The flange 6 defines seven elongate cut-outs 10 that extend circumferentially within the flange 6, as shown in FIG. 2. The cut-outs 10 each have a uniform, substantially diamond-shaped radial cross-section. Each cut-out 10 has a height of 1.3 mm and a width of 1.1 mm. The provision of diamond-shaped cut-outs 10 in the flange 6 means that, upon (vertical) axial compression of the burst disk 2, the flange 6 can expand significantly in the (horizontal) radial direction.

In between each cut-out is a shorter solid support section 7 of the flange 6. Thus the flange 6 has seven support sections 7. Each support section 7 is solid and homogeneous, in order to provide greater structural support to the flange 6 and to the burst disk 2. This may allow the burst disk 2 to better withstand compression forces during installation and help to protect the membrane 4 from damage. In this example, each support section 7 spans approximately 10 degrees, while each cut-out 10 defines a hollow arc of approximately 41.2 degrees. However, the provision of such support sections 7 is optional; in other examples, the flange 6 may define a single cut-out 10 as a continuous ring all around the disk 2; this may help provide rotationally-uniform expansion under of the flange 6 under axial compression.

The ring-like sealing lip 8 has a uniform, substantially-triangular radial cross-section. It has a ring-like apex 8a which defines an axial extent of the disk 2. The circle defined by the apex 8a is radially aligned with the center of each cut-out 10.

The diameter of the membrane is 15 mm. The total diameter of the burst disk 2 is 18 mm.

Figure 4:
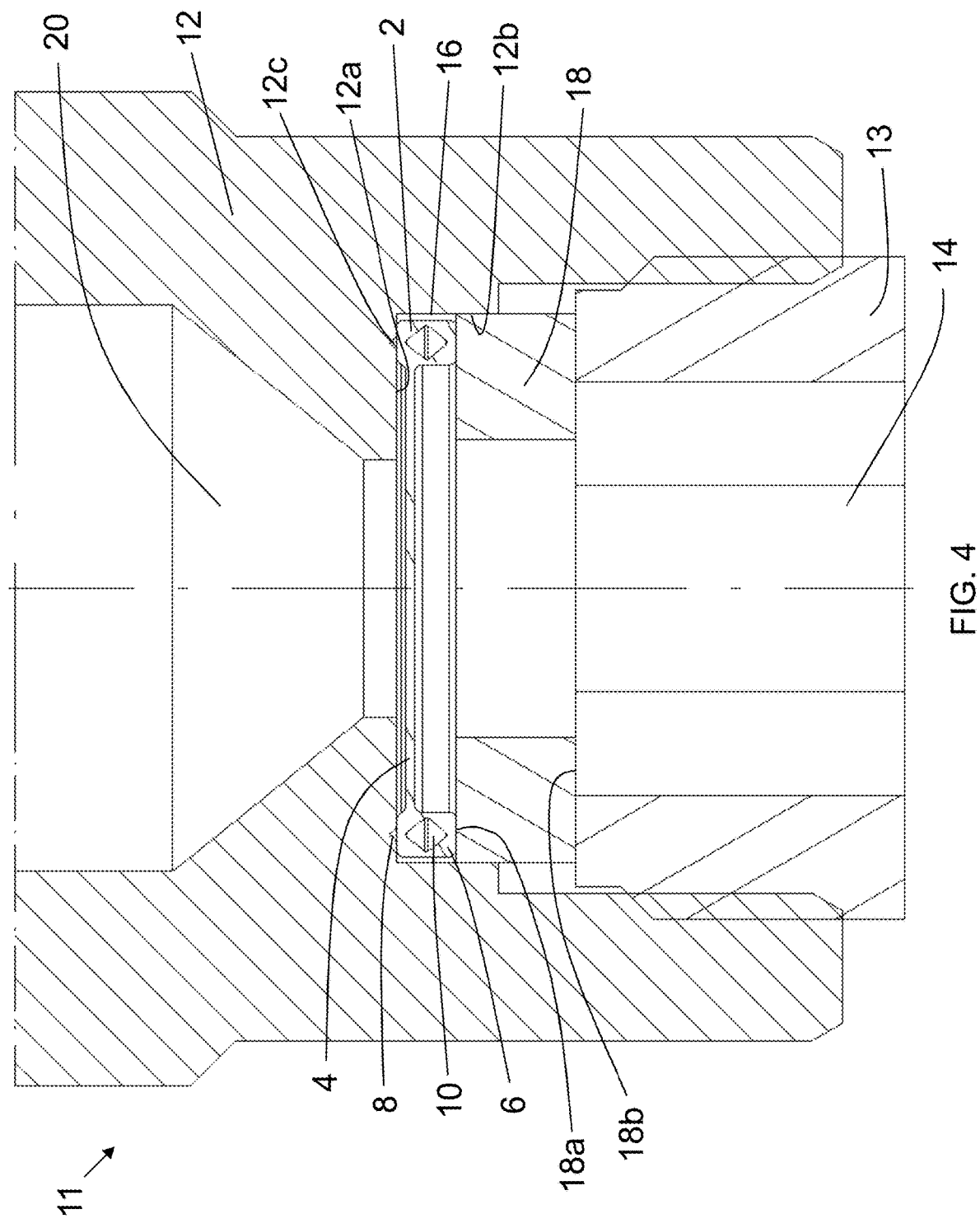
FIG. 4 shows a cross-sectional side view of the burst disk of FIG. 1, in an uncompressed state, positioned within a high-pressure inflation valve.

FIG. 4 shows a cross-sectional side view of the burst disk 2 of FIG. 1, in an uncompressed state, positioned within a high-pressure inflation valve 11. The inflation valve 11 comprises a housing 12 that defines a central bore (oriented vertically in FIG. 4) and is substantially rotationally symmetric around the axis of the central bore. The housing 12 has a stepped inner surface comprising a horizontal radial sealing face 12a and a vertical axial sealing face 12b, where the axial sealing face 12b extends perpendicularly from the radial sealing face 12a.

The axial sealing face 12b of the housing 12 defines a cylindrical region 16 within which the burst disk 2 is located. The diameter of the region 16 is fractionally greater than the diameter of the burst disk 2—e.g. being around 18.25 mm in diameter.

The radial sealing face 12a provides a seat for the upper surface 6a of the flange 6 of the burst disk 2.

The inflation valve 11 further comprises a metal or polymer washer 18. The washer 18 is cylindrical and comprises a central bore that is coaxial with the central bore of the housing 12. The outer circumferential (vertical) face of the washer 18 is arranged to loosely abut the axial sealing face 12b of the housing 12. The upper surface 18a of the washer 18 can be moved axially so as to apply pressure to the lower surface 6b of the flange 6 of the burst disk 2.

The inflation valve 11 further comprises a rotatable nut 13, which is able to engage the lower surface 18b of the washer 18, so as to drive the washer 18 towards the burst disk 2. The nut 13 is cylindrical and comprises a central bore that is coaxial with the central bore of the washer 18 and the central bore of the housing 12. The nut 13 has a helical screw thread on its outer face that engages with a corresponding helical screw thread on the axial sealing face 12b of the housing 12.

Thus, the nut 13 may be moved towards the washer 18 by rotation of the nut 13. FIG. 4 shows the nut 13 at the position where it only just abuts the lower surface of the burst disk 2 without applying significant compressive force to the flange 6.

Rotation of the nut 13, in order to move the nut 13 and the washer 18 towards the disk 2, causes the washer 18 to push against the underside 6b of the flange 6 of the burst disk 2. The axial movement of the washer 18 causes the burst disk 2 to be compressed between the upper face 18a of the washer 18 and the radial sealing face 12a of the housing 12. The provision of the washer 18 means that the burst disk 2 is not directly subject to the rotational forces caused by the rotation of the nut 13, which might otherwise damage the flange 6 or membrane 4.

Figure 5:
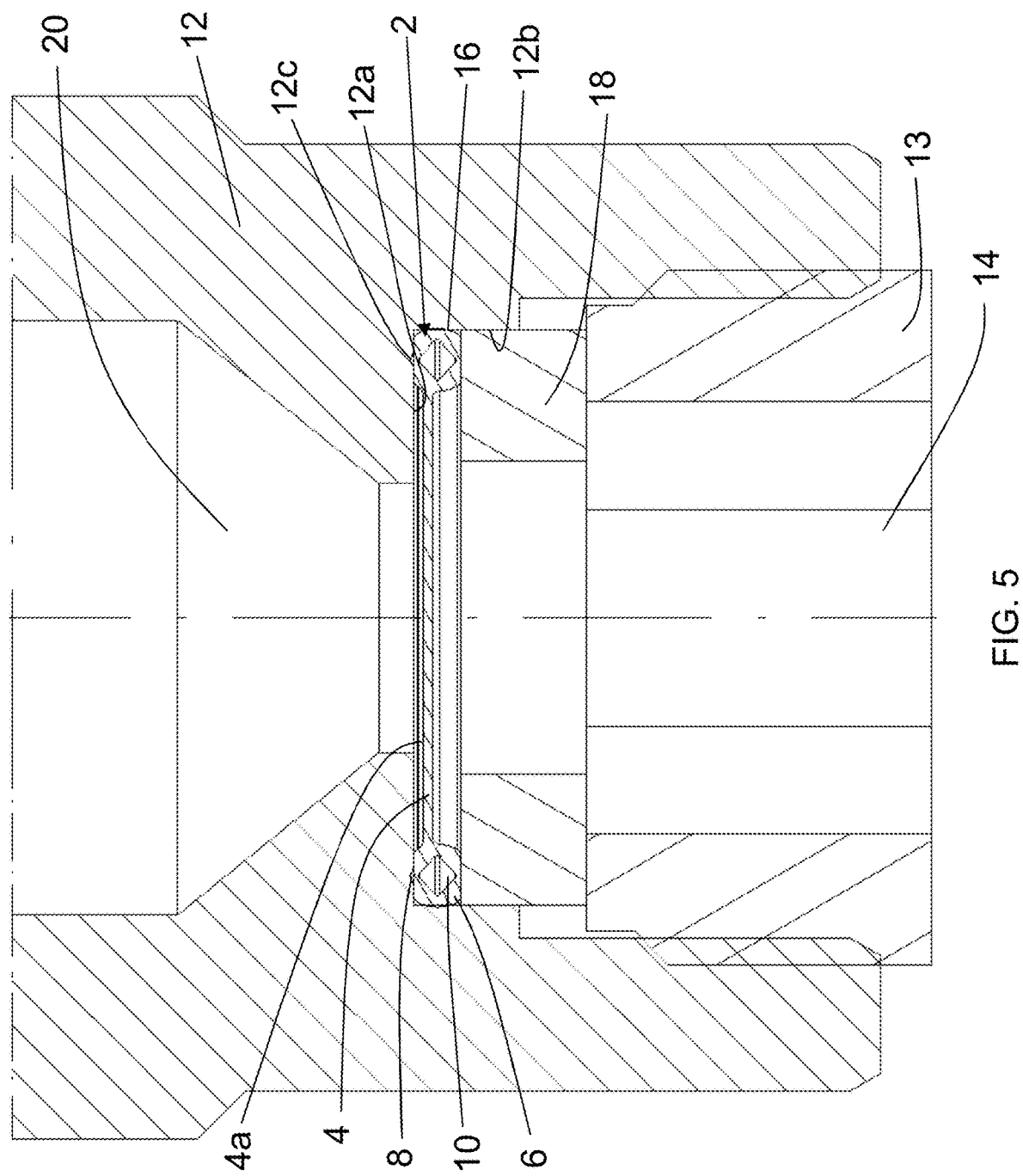
FIG. 5 shows a cross-sectional side view of the burst disk of FIG. 1, in a compressed state, positioned within the high-pressure inflation valve.

FIG. 5 shows a cross-sectional side view of the burst disk 2 of FIG. 4 in which the nut 13 has been rotated in order to compress the burst disk 2 against the radial sealing face 12a of the housing 12.

This compression forms an axial seal between the burst disk 2 and the housing 12 as a result of radial expansion of the flange 6 of the burst disk 2, which is caused by the axial deformation and radial expansion of the flange around the cut-outs 10, under compression. This radial expansion establishes a tight interface between the vertical outer surface 6c of the flange 6 and the axial sealing face 12b of the housing 12. This prevents the axial passage of fluid around the outside of the burst disk 2.

Additionally, a concave circular groove 12c extends circumferentially around the radial sealing face 12a of the housing 12. The groove 12c is dimensioned to mate with the sealing lip 8 of the burst disk 2 to form a seal for preventing the passage of fluid radially past the radial sealing face 12a. This radial seal is formed as a result of the interface between the sealing lip 8 and the groove 12c, as the washer 18 presses the lip 8 into the groove 12c.

The inner surface of the nut 13, the inner surface of the washer 18 and the lower surface of the burst disk 2 together bound a first volume 14. The housing 12 and the upper surface of the burst disk 2 together bound a second volume 20. In use, the first volume 14 is fluidly connected to a high pressure chamber, e.g. a cylinder of compressed gas, and the second volume 20 is connected to a lower pressure chamber, e.g. an inflatable safety device in a deflated state at atmospheric pressure.

The provision of two seals—one radial and one axial—between the first volume 14 and the second volume 20 helps to ensure that fluid does not leak from the high pressure chamber to the low pressure chamber, even if the performance one of the seals is impaired for any reason.

The burst disk 2 is designed such that, when the inflation valve 11 is activated to pass fluid through the main axial bore, the membrane 4 will rupture, thus allowing pressure to vent from the high pressure chamber to the low pressure chamber. The burst disk 2 of FIGS. 1-5 is designed to rupture at a pressure differential of 225 bar, although it will be appreciate that burst disks may be engineered for many different burst pressures, depending on the application.

In some examples, an engagement rod (not shown) may be arranged to apply axial pressure over at least part of the upper surface 4a of the membrane 4, thus reducing the pressure differential across the burst disk 2. In such an example, the thickness of the membrane 4 may be selected such that the removal of the engagement rod causes the pressure differential to increase above a predetermined threshold, thus causing the burst disk 2 to rupture.

In alternative examples, the burst disk 2 may instead be a puncture disk. Thus the membrane 4 may be designed to be punctured by a puncturing element, such as a needle (not shown).

The engagement rod (or puncturing element) may be actuated in an emergency (e.g. by an electronic control system, or by a human user) in order to rupture the disk 2 and release high-pressure fluid from the high pressure chamber, through the inflation valve 11. For example, the valve 11 may be used in the inflation mechanism of an evacuation raft on an airplane.

The burst disk 2 (or puncture disk) may be installed between the housing 12 and the nut 13 without the need for lubricant, or with only a small quantity of lubricant, as the burst disk 2 does not establish an interference fit with the housing 12 until it is compressed by the relative movement of the nut 13 towards the housing 12.

As the burst disk 2 is a single monolithic structure, it may be manufactured conveniently and cheaply using an additive manufacturing process such as 3D printing. The use of 3D printing may also allow the cut-outs 10 within the flange 6 of the burst disk 2 to be fabricated with small dimensions.

Although the present disclosure has been described with reference to one particular orientation, it will be appreciated by those skilled in the art that the present disclosure may be implemented in any orientation, and references to "upper", "lower", "vertically", etc. herein should be interpreted accordingly.

In another set of examples, the burst disk 2 may be retained in a housing, similar to the housing 12 of FIG. 4, which is provided for the purposes of an over-pressure safety device, rather than as an inflation valve. For example, the housing may be located in the wall of a gas cylinder, with the burst disk 2 designed to ruptured spontaneously if the pressure in the cylinder exceeds a threshold level (relative to the ambient pressure outside the cylinder), to prevent the cylinder from exploding dangerously.

It will be appreciated by those skilled in the art that the disclosure has been illustrated by describing several specific examples thereof, but is not limited to these examples; many variations and modifications are possible, within the scope of the accompanying claims.

What is claimed is:

1. A rupture disk for use in a fluid control system, the rupture disk comprising:
   a membrane; and
   a compressible flange, around a perimeter of the membrane, wherein the flange defines at least one perimetrically extending closed void and wherein the rupture disk is formed of a homogeneous material.

2. A rupture disk as claimed in claim 1, wherein the rupture disk is rotationally symmetric about an axis.

3. A rupture disk as claimed in claim 1, wherein the flange has a substantially rectangular cross-section.

4. A rupture disk as claimed in claim 1, wherein each of the one or more voids has a polygonal cross-section.

5. A rupture disk as claimed in claim 4, wherein each of the one or more voids has a diamond-shaped cross-section.

6. A rupture disk as claimed in claim 1, wherein each of the one or more voids is completely enclosed within the compressible flange.

7. A rupture disk as claimed in claim 1, wherein the rupture disk further comprises one or more solid support segments within the flange, wherein the one or more solid support segments are arranged to span one or more respective angular ranges around the flange that are not spanned by the one or more voids.

8. A rupture disk as claimed in claim 1, wherein a diameter of the rupture disk is between 5 mm and 30 mm.

9. A rupture disk as claimed in claim 1, wherein a thickness of the membrane is between 0.1 mm and 1 mm.

10. A rupture disk as claimed in claim 1, wherein a diameter of the membrane is between 5 mm and 25 mm.

11. A rupture disk as claimed in claim 1, further comprising a perimetrically-extending lip that protruded axially from an outer surface of the compressible flange.

12. A rupture disk as claimed in 11, wherein the lip extends around an entire perimeter of the rupture disk.

13. A fluid control system comprising:
a rupture disk that includes:
a membrane; and
a compressible flange, around a perimeter of the membrane, wherein the flange defines at least one perimetrically extending closed void and wherein the rupture disk is formed of a homogeneous material; and
a housing for the rupture disk.

14. A fluid control system as claimed in claim 13, wherein the housing comprises an axially-extending mating surface for mating with an outer surface of the compressible flange.

15. A fluid control system as claimed in claim 14, wherein the axially-extending mating surface is cylindrical and has a larger diameter than a diameter of the rupture disk when the flange is uncompressed.

16. A fluid control system as claimed in claim 13, comprising a compression mechanism for axially compressing the compressible flange.

17. A fluid control system as claimed in claim 16, wherein the compression mechanism comprises a washer and a rotatable nut.

18. A fluid control system as claimed in claim 13, wherein the housing defines an elongate groove arranged to mate with a lip of the rupture disk.

19. A method of installing a rupture disk within a housing, wherein the rupture disk comprises: a membrane; and a compressible flange, around a perimeter of the membrane, wherein the flange defines at least one perimetrically extending closed void wherein the rupture disk is formed of a homogeneous material, the method comprising:
positioning the rupture disk within the housing.

20. A method as claimed in claim 19, comprising compressing the flange in a direction axial to the disk.

* * * * *